Patented Aug. 8, 1939

2,168,808

UNITED STATES PATENT OFFICE 2,168,808

ACCELERATION OF VINYL HALIDE POLYMERIZATION

Frank K. Schoenfeld, Silver Lake Village, Ohio, assignor to The B. F. Goodrich Company, New York, N. Y., a corporation of New York No Drawing. Application July 2, 1937, Serial No. 151,666

5 Claims. (Cl. 260—88)

This invention relates to the polymerization of vinyl halides, and has as its principal object to increase materially the rate of formation of polyvinyl halides.

Polymerization of vinyl halides may be accomplished by many methods. It may be carried out in the vapor phase, in solution in many different types of solvent, or in a dispersion of the liquid vinyl halide in water or other immiscible liquid. Polymerization is catalyzed by actinic radiation, or by per-compounds in general, including peroxides such as calcium peroxide, barium peroxide, and benzoyl peroxide, per-acids such as persulfuric acid and per-salts such as the perborates, percarbonates, and perphosphates. While elevation of pressure and temperature accelerates the polymerization, the proportion of soluble, alpha and beta polymers to the insoluble, gamma polymer in the product is increased very greatly thereby. Hence to prepare the gamma polymer of vinyl chloride in good yields, it has been necessary to effect the polymerization at comparatively low temperatures and pressures, usually below 50° C. and 10 atmospheres in the presence of a catalyst for very long times. These polymerizations have been carried out in the presence of at least a small amount of air as a matter of convenience.

I have discovered that the rate of production of the polymers of vinyl halides may be greatly increased if the polymerization is carried out substantially in the absence of oxygen. Though the invention is useful in the production of any polyvinyl halide, it is especially useful in the preparation of the gamma polymers since high temperatures and pressures cannot advantageously be used in their manufacture, as has heretofore been indicated.

The method of my invention may be applied to many different methods of polymerization. To determine the effect of oxygen upon thermal polymerization, three pyrex reaction tubes 8½ inches long and ⅞ inch in diameter were cooled in an acetone-solid carbondioxide bath and blown out with the gas to be enclosed. Twenty grams of vinyl chloride and one percent of benzoyl peroxide were added to each tube, the space above the vinyl chloride was briefly swept out with a gentle stream of the desired gas, and the tubes were quickly sealed. The tubes were rotated in a water bath maintained at a temperature of 40-43° C. The percent conversion after 24 hours in the presence of three gases is shown in the following table:

| Enclosed gas | Percent conversion |
|---|---|
| Oxygen | 4.5 |
| Air | 27.0 |
| Nitrogen | 65.0 |

Three other reaction tubes similarly prepared were placed in the direct sunlight to determine the effect of oxygen upon actinic polymerization. The lengths of time required to bring about the formation of a distinct turbidity due to the formation of the insoluble polymer in three different gases are shown in the following table:

| Enclosed gas | | Time |
|---|---|---|
| Oxygen | hours | 2 |
| Air | minutes | 20 |
| Nitrogen | minutes | 10 |

Experiments with other gases besides nitrogen showed conclusively that the inhibiting effect was due to the oxygen. In most gases the rate of polymerization was similar to that in nitrogen, but polymerizations carried out in the presence of carbon dioxide proceeded approximately twice as rapidly as those in other gases.

The method of my invention may be applied to commercial processes to greatly increase yields with but little additional expense. One method of forming gamma polyvinyl chloride is to charge an autoclave with water 20 parts by weight, catalyst such as benzoyl peroxide 0.2 part and emulsifying agent such as sodium lauryl sulfonate 0.3 part. 20 parts of liquid vinyl chloride cooled to a temperature below its boiling point are measured out and blown into the autoclave by means of compressed air, and the temperature is adjusted at 40°-45° C., the pressure rising to 5-6 atmospheres. The polymerization must be continued at this temperature and pressure for seventy-two hours to obtain yields of from 85 to 90%. By blowing the vinyl chloride into the autoclave by means of carbon dioxide, hydrogen, or nitrogen, the polymerization may be accomplished in from one-half to even less than one-fourth of the time required for the same polymerization in the presence of oxygen. It can be readily seen that this invention provides a very valuable means for decreasing the time required to effect the polymerization without decreasing the proportion of gamma polymer formed.

Though the complete exclusion of oxygen produces the greatest increase in the rate of polymerization since its inhibiting effect is proportioned to the amount present, it is neither necessary nor commercially feasible to exclude all traces of oxygen to secure the beneficial results of my invention. As a practical matter, the air is not removed from the autoclave before the reactants are charged therein, nor is the dissolved air removed from the water. By merely substituting another gas for the air used in the pumping operation, I am able to reduce the time required to effect the polymerization to less than half its former value. Even in the experiments in which the tubes were filled with different gases, no elaborate precautions were used to eliminate oxygen as the tubes were sealed while open to the air. The term "in a substantially oxygen-free medium" is used in the appended claims to apply to a polymerization in which all traces of oxygen may not have been excluded, but in which ordinary precautions are used to reduce the amount of oxygen to a minimum.

I claim:

1. The method of increasing the rate of polymerization of liquid vinyl chloride to form the gamma polymer which comprises effecting said polymerization in an aqueous emulsion in the presence of a per-compound catalyst at a temperature below 50° C. and a pressure below 10 atmospheres in a vessel containing free gas space, such gas space being substantially oxygen-free.

2. The method of increasing the rate of polymerization of liquid vinyl chloride to form the gamma polymer which comprises effecting said polymerization in the presence of a per-compound catalyst in a substantially oxygen-free medium at a temperature below 50° C. and a vapor pressure substantially of water, vinyl chloride and hydrogen of less than 10 atmospheres.

3. The method of increasing the rate of polymerization of liquid vinyl chloride to form the gamma polymer which comprises effecting said polymerization in the presence of a per-compound catalyst at a temperature below 50° C. and a vapor pressure substantially of water, vinyl chloride, and carbon dioxide of less than 10 atmospheres.

4. The method of increasing the rate of polymerization of liquid vinyl chloride to form the gamma polymer which comprises effecting said polymerization in the presence of a per-compound catalyst at a temperature below 50° C. and a vapor pressure substantially of water, vinyl chloride, and nitrogen of less than 10 atmospheres.

5. The method of increasing the rate of polymerization of liquid vinyl chloride which comprises effecting said polymerization in the presence of a per-compound catalyst at a temperature below 50° C. and a vapor pressure substantially of vinyl chloride and nitrogen of less than 10 atmospheres.

FRANK K. SCHOENFELD.